United States Patent [19]

Bingham

[11] 3,946,227

[45] Mar. 23, 1976

[54] MASS SPECTROGRAPHS AND ION COLLECTOR SYSTEMS THEREFOR

[75] Inventor: Richard Albert Bingham, Urmston, England

[73] Assignee: Associated Electrical Industires Limited, London, England

[22] Filed: Apr. 10, 1974

[21] Appl. No.: 459,560

[30] Foreign Application Priority Data

Apr. 12, 1973 United Kingdom ............... 17589/73

[52] U.S. Cl. .................................. 250/281; 250/283

[51] Int. Cl.² ........................................... B01D 59/44

[58] Field of Search ........... 250/281, 282, 283, 299, 250/300, 227, 368, 369

[56] References Cited

UNITED STATES PATENTS

| | | | |
|---|---|---|---|
| 3,240,931 | 3/1966 | Wiley et al. | 250/299 |
| 3,426,192 | 2/1969 | Brunnee et al. | 250/299 |
| 3,522,428 | 8/1970 | Powers | 250/299 |
| 3,579,270 | 5/1971 | Daly | 250/282 |
| 3,717,762 | 2/1973 | Grenier et al. | 250/227 X |
| 3,786,249 | 1/1974 | Anbar et al. | 250/299 |
| 3,812,354 | 5/1974 | Walter | 250/281 |

*Primary Examiner*—Davis L. Willis
*Attorney, Agent, or Firm*—Watts, Hoffmann, Fisher & Heinke Co.

[57] ABSTRACT

To provide electrical outputs from very closely spaced ion collectors in a mass spectrograph, use is made of appropriately positioned wires or tapes which emit secondary electrons when struck by ions. The secondary electrons in turn strike respective scintillators to generate light. Lightguides, such as glass fibres, conduct the light from the scintillators to respective photomultipliers, which can therefore be spaced as necessary, the bulk of the photomultipliers being much greater than the spacing of the ion collector wires.

The wires or tapes can be in a single row in the focal plane, or in rows staggered about the focal plane.

6 Claims, 6 Drawing Figures

MASS SPECTROGRAPHS AND ION COLLECTOR SYSTEMS THEREFOR

This invention relates to mass spectrographs and ion collector systems therefor.

It is well known in the use of mass spectrographs, for example of the type employing Mattauch-Herzog geometry, to use a photographic plate as an ion detector. Such an arrangement is exemplified by the MS7 mass spectrograph sold of AEI Scientific Apparatus Ltd. However, it is considered desirable in certain circumstances for the output of mass spectrograph to be available as an electrical signal. Sensitive ion detectors with electrical outputs are known but they have a certain bulk and so cannot be arranged to intercept ion beams which are very close together unless special arrangements are employed, for example as shown in FIG. 2 of United Kingdom Pat. Specification No. 1250942. However this previously described arrangement would be impracticable where a large number of ion beams of adjacent mass numbers have to be studied during operation of a mass spectrograph, these ion beams of adjacent mass numbers being clearly separated from each other (and from the original ion beam containing ions of all mass-to-charge ratios) and more or less focused only in or nearly in the focal plane of the spectrograph.

It is therefore an object of the invention to provide an improved mass spectrograph, and an improved ion collector system for a mass spectograph.

According to a first aspect of the invention, a mass spectrograph comprises magnetic means for creating a magnetic field, ion source means for forming an ion beam from a substance to be analyzed and for directing the ion beam through the magnetic field such that ions of different mass-to-charge ratios are deflected by different amounts and are focussed substantially in a focal plane, a plurality of ion sensitive means disposed in or adjacent to the focal plane so as to intercept ions which are respectively substantially only of a single mass-to-charge ratio, these ratios being different for each of the ion sensitive means, the ion sensitive means being sensitive to the interception of ions to emit secondary electrons, a plurality of scintillators disposed and charged (in use) to attract secondary electrons each substantially only from an individual one of the ion sensitive means, each scintillator having a respective one of a plurality of light guide means associated therewith to guide light substantially only from the respective scintillator to a respective one of a plurality of light-to-electricity converters, whereby the output of each converter during use of the mass spectrograph is a measure of the presence in the ion beam of ions of a particular mass-to-charge ratio.

The scintillators may be any suitable devices which emit light when impacted by the secondary electrons. The light guides may be totally internally reflecting glass fibres. The light-to-electricity converters may be photomultipliers.

The ion sensitive means may be in the form of wires or tapes, and are preferably dimensioned so that in use they intercept ions substantially of only a single mass-to-charge ratio. In this latter respect, the width of the ion sensitive means along the focal plane in the direction of changing mass-to-charge ratios can be equated to the width of a slit for passing ions of substantially only the same mass-to-charge ratio and with the same resolution between different mass-to-charge ratios.

The mass spectrograph may have an electrostatic sector for energy filtering of the ion beam, and may thus be double focussing.

According to a second aspect of the invention, an ion collector system for a mass spectrograph comprises a plurality of ion sensitive means disposed in or adjacent to a plane, the ion sensitive means being sensitive to the interception of ions to emit secondary electrons, a plurality of scintillators so disposed that in use and with the scintillators maintained at suitable potentials relative to the ion sensitive means, the scintillators attract secondary electrons each substantially only from an individual one of the ion sensitive means, a light guide means associated with each scintillator to guide light substantially only from the respective scintillator to a respective one of a plurality of light-to-electricity converters.

The combination of the ion collector system and a mass spectrograph having the ion collector system mounted therein with said plane substantially coincident with the focal plane of the spectograph may from a mass spectrograph according to the first aspect of the invention.

Embodiments of the invention will now be described by way of example, with reference to the accompanying drawings wherein.

Figure 1:
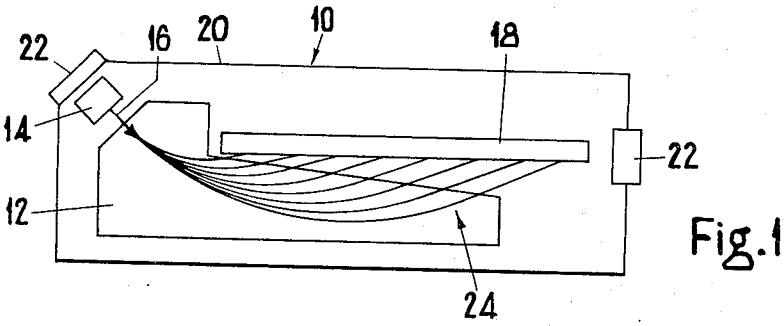
FIG. 1 is a schematic diagram of the essential elements of a mass spectrograph.

Referring first to FIG. 1, this is an explanatory diagram to make clear the context of the invention. FIG. 1 schematically shows the essential elements of a mass spectrograph 10, comprising a magnet 12 between whose pole faces a uniform steady magnetic field is created in use, an ion source 14 within which a substance to be analyzed is ionized and an ion beam 16 formed therefrom and directed through the magnetic field, and an ion detector system 18 disposed along the focal plane of the spectrograph 10. An enclosure 20 forms a vacuum tight envelope so that at least those parts of the spectrograph 10 through which ions travel can be maintained at a high vacuum. Airlocks or other suitable devices 22 in the enclosure 20 enable introduction of the substance to be analysed to the ion source 14, and also enable access to the detector system 18 without destroying the vacuum in the spectrograph 10. An electrostatic sector (not shown), providing a part-cylindrical steady electrostatic field in use, may be disposed between the source 14 and the magnet 12 whereby to energy filter anad velocity focus ions in the ion beam 16, and thereby make the spectograph 10 double focussing. Such a spectrograph is exemplified by the aforementioned MS7, which employed a photographic plate as the ion detector system.

As shown in FIG. 1, and as provided with an electrostatic sector, the ion beam geometry of the spectrograph 10 is generally that of Reutersward, but the geometries of Mattauch and Herzog, Bainbridge and Jordan, Dempster, and others may be employed within the scope of the invention.

In operation of the spectograph 10, the ion beam 16 is deflected by the magnetic field produced by the magnet 12. Assuming equal energy ions (which can be ensured by the use of an electrostatic sector as aforesaid,) the deflection of any ion is according to the mass-to-charge ratio of the ion. Lighter ions are deflected more than heavier ions. With the correct dimensions and fields, deflected ions are focused in a focal plane, ions of different mass-to-charge ratios being focused at different points along the plane. Thus a suitable ion detector system 18 can give information as to the constitution of the substance that was ionized in the source 14.

Figure 2:
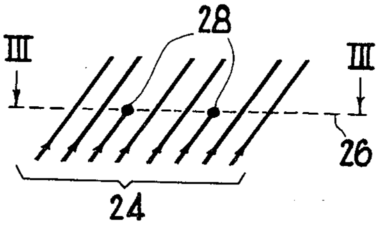
FIG. 2 is a schematic diagram showing the operation of part of a mass spectrograph and ion collector system in accordance with the invention.
Figure 3:
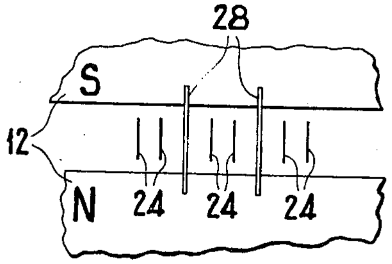
FIG. 3 is a view taken on the line III—III in FIG. 2.

Referring now to FIG. 2, this schematic diagram shows a plurality of deflected beams 24 of ions of adjacent mass numbers passing through the focal plane 26 of the spectrograph 10. Two of the beams 24 are intercepted by ion sensitive means 28 constituted by narrow wires. The diameter of the wires 28 is approximately equal to the width of a hypothetical slit (not shown) disposed in the focal plane 26 to pass only ions of one mass number. FIG. 3 shows the arrangement of FIG. 2 in the direction III—III, these parts of the ion beams 24 not in the focal plane 26 being omitted for clarity. The wires 28 are made of a suitable material which emits adequate quantities of secondary electrons when struck by ions. The wires 28 are maintained at ground potential by means not shown, but if ions striking the wires 28 were not energetic enough to produce secondary electrons, or if the production of secondary electrons was inefficient, the wires 28 could be maintained at some negative potential. Means for mounting the wires 28 is not shown, and could take any suitable form; for example, the wires 28 could be strung across a frame. The positions of the wires 28 are preferably individually adjustable.

Figure 4:
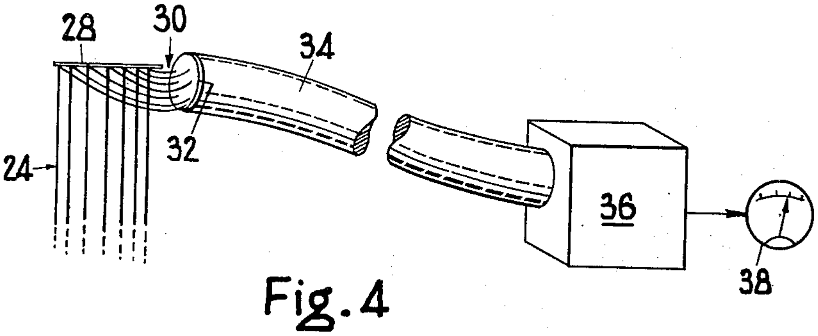
FIG. 4 is a schematic diagram showing operation of part of an embodiment of the invention.

Referring now to FIG. 4, this shows an individual one of the wires 28, together with its associated apparatus. When struck by ions 24, the wire 28 emits secondary electrons 30. A scintillator 32 is disposed in relation to the wire 28, and suitably positively charged, to attract these secondary electrons 30. Light produced by secondary electrons 30 striking the scintillator 32 are conveyed along a light-guide 34 (e.g. one or a bundle of totally internally reflecting glass fibres) to a photomultiplier 36 which converts received light to an electrical signal. The electrical output signal from the photomultiplier 36 is displayed on a suitable instrument 38 or otherwise utilised to give an indication of the quantity of ions being intercepted by the wire 28, which due to the positioning of the wire 28 to intercept ions of substantially only a single mass-to-charge ratio, is a qualitative and quantitative indication of one constituent of the ion beam 16. The light guides 34 enable conventional bulky photomultipliers to be employed and to be disposed at positions where their bulk can be readily accomodated.

Figure 5:
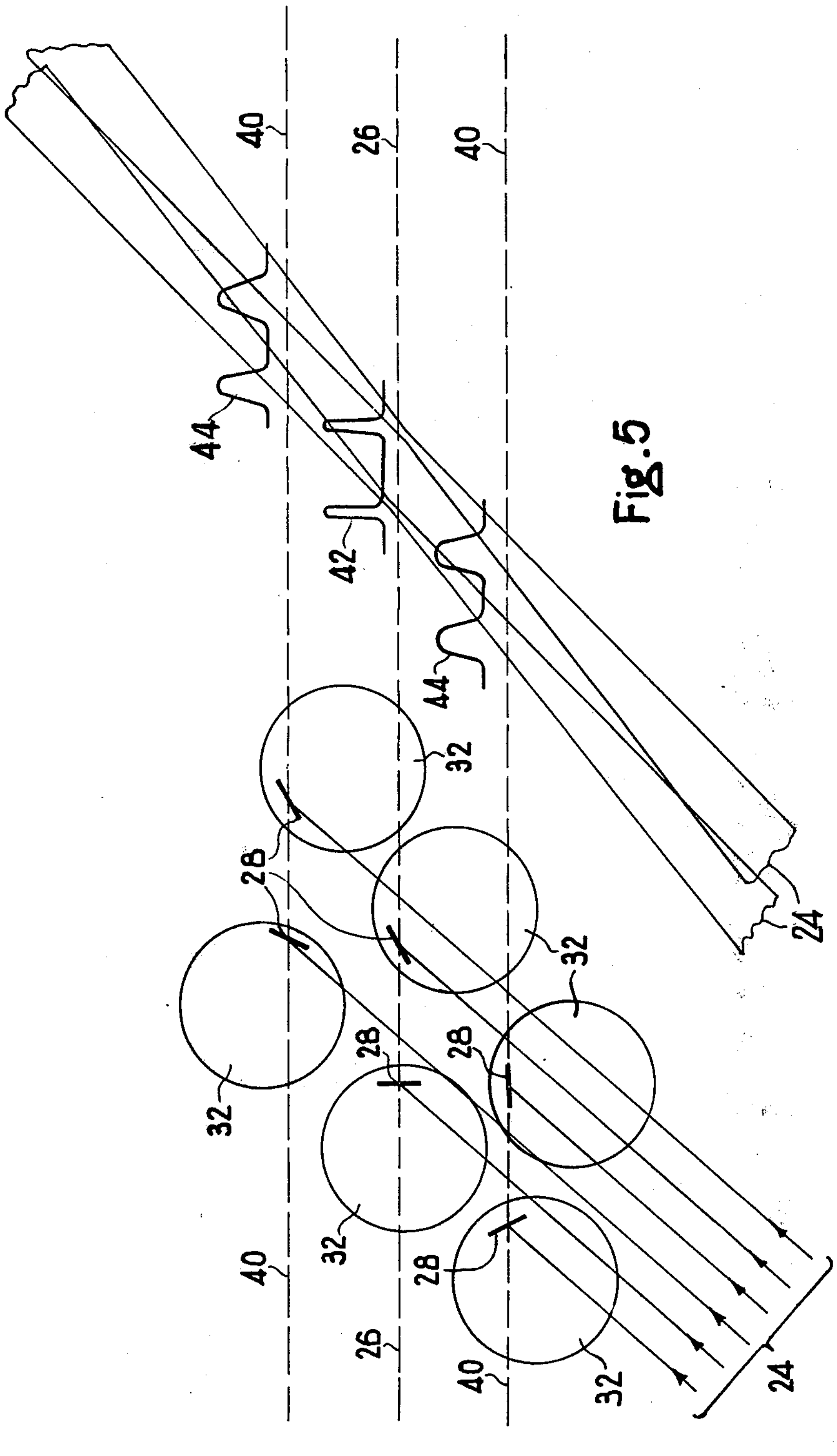
FIG. 5 is a schematic diagram showing operation of another embodiment of the invention.
Figure 6:
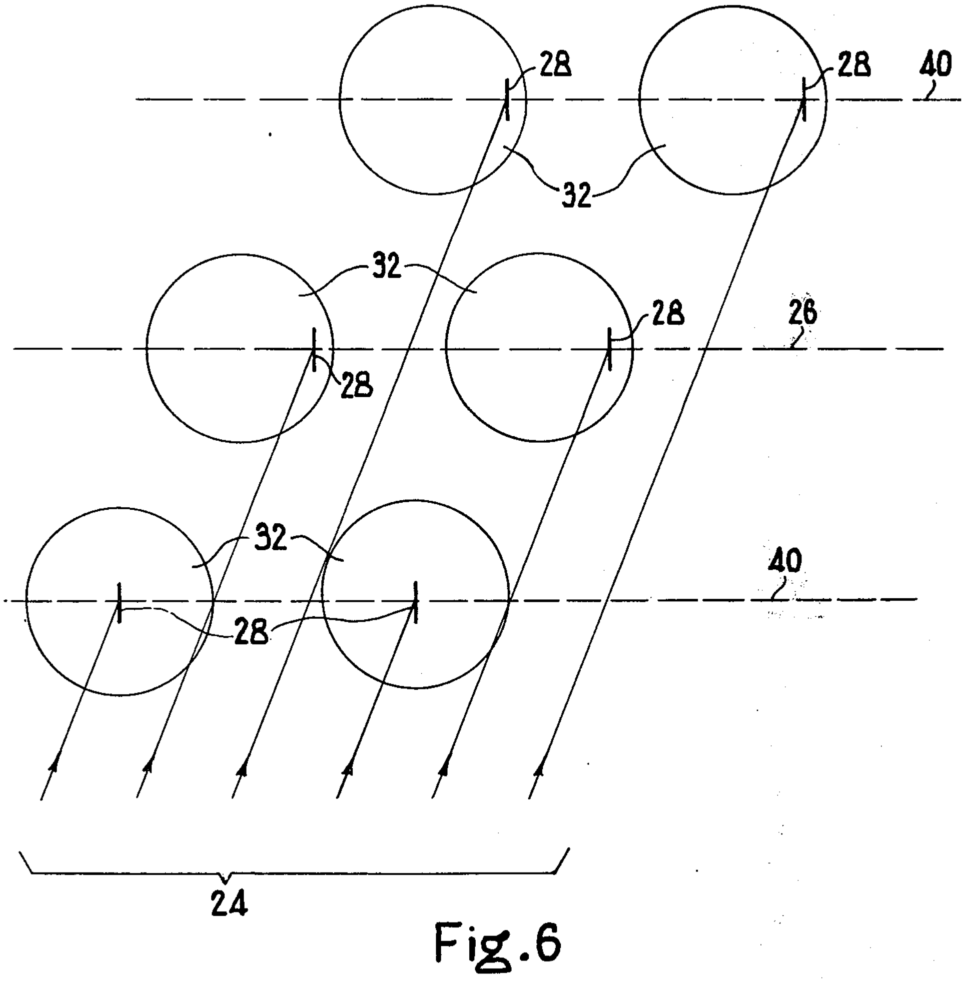
FIG. 6 is a schematic diagram showing operation of a further embodiment of the invention.

It will be appreciated that while it is possible to arrange the wires 28 (which are of small diameter) close together without mutual interference, even where adjacent wires have to intercept ions of adjacent mass numbers, this is not necessarily the case for practicable scintillators, especially if each scintillator 32 is to attract secondary electrons 30 from only a single wire 28. FIGS. 5 and 6 are concerned with practicable arrangements for spacing the wires 28 and their respective scintillators 32, where ions of adjacent mass number have to be collected.

In FIGS. 5 and 6, the wires which formed the ion sensitive structures 28 in FIGS. 2, 3, & 4 are replaced by tapes which emit secondary electrons in like manner to the wires. It will be seen from FIGS. 5 and 6, and their specific description how the tapes tend to give directional emission of secondary electrons, the respective scintillator being arranged along this direction in each case.

Dealing first with FIG. 5, (whose direction of view corresponds with that of FIG. 2) this shows an ion collector system for collecting ion beams 24 of six adjacent mass numbers. The separation of the nominal paths ion beams 24 is of the order of fourteen thousandths of an inch at the focal plane 26, while scintillators 32 having a diameter of eighty thousandths of an inch are employed. Thus not all the scintillators can be accomodated in the focal plane 26, and so they are staggered on either side of the focal plane 26 as shown. Six metal tapes 28 are disposed alternately in the focal plane 26, and in planes 40 fifty thousandths of an inch on either side of the focal plane 26, so that each of the tapes 28 intercepts one, and one only, of the ion beams 24. The tapes 28 are in each case aligned so that the broad face which intercepts a respective ion beam 24 is approximately at right angles to a diameter of the respective scintillator 32, so as to increase the exclusiveness of capture of secondary electrons from the appropriate tape 28.

In FIG. 5, the tapes 28 are shown disposed in the nominal paths of the ion beams 24. The actual paths followed by the ions in two adjacent beams are shown on the right of FIG. 5. It will be seen that the composite ion paths are narrowest in the focal plane 26, i.e. the ion beams 24 are focused in the plane 26. However, the ion beams are still reasonably separated in the planes 40, as may be seen from the plot 42 of ion intensity versus displacement along the focal plane 26 and the corresponding plots 44 for the planes 40.

FIG. 6 shows an alternative arrangement to that of FIG. 5. In FIG. 6 smaller scintillators 32 are used, and are disposed so that as far as possible, the paths of the ion beams 24 do not pass over scintillators associated with tapes 28 which are not intended to intercept that particular ion beam. The scintillators 32 may be of transparent plastic incorporating an organic material such as anthracene.

While various particular devices have been mentioned in the above description of exemplary embodiments, functional equivalents thereof may be employed within the scope of the invention.

I claim:

1. An ion collector system for a mass spectrograph in which ions of different mass-to-charge ratios in an ion beam passing through the spectrograph are focused at different points in a focal plane, comprising a plurality of ion sensitive means that are elongated in a direction generally transverse to said ion beam and are disposed generally parallel to one another in or adjacent to said focal plane, each in the path of ions of substantially only a single mass-to-charge ratio at any given time, said ion sensitive means being responsive to the interception of ions to emit secondary electrons, a plurality of scintillators each disposed adjacent a respective one of the ion sensitive means and substantially alongside the path of said ions, means to bias said scintillators to attract said secondary electrons each substantially only from a respective one of said ion sensitive means, a plurality of light to electricity converters, and a plurality of light-guide means associated one with each scintillator to guide light substantially only from the respective scintillator to a respective one of said light to electricity converters.

2. A ion collector system in accordance with claim 1 wherein the light guides are totally internally reflecting glass fibres.

3. A ion collector system in accordance with claim 1 wherein the light-to-electricity converters are photomultipliers.

4. A ion collector system in accordance with claim 1 wherein the ion sensitive means are in the form of wires.

5. A ion collector system in accordance with claim 1 wherein the ion sensitive means are in the form of tapes.

6. The ion collector system in accordance with claim 1 and further including means for creating a magnetic field, ion source means for forming an ion beam and for directing said ion beam through the magnetic field such that ions of different mass-to-charge ratios are deflected by different amounts and are focused substantially at different points in a focal plane, thereby providing a mass spectrograph.

* * * * *